United States Patent
Jeon et al.

(10) Patent No.: US 12,236,567 B2
(45) Date of Patent: Feb. 25, 2025

(54) IMAGE EVALUATION METHOD THAT CAN QUANTIFY IMAGES DISTORTED BY ARTIFACTS, COMPUTER PROGRAM PERFORMING THE METHOD, AND COMPUTING DEVICE

(71) Applicant: SAMSUNG ELECTRONICS CO., LTD., Suwon-si (KR)

(72) Inventors: Seungwan Jeon, Hwaseong-si (KR); Kundong Kim, Seongnam-si (KR); Sungsu Kim, Yongin-si (JP); Daeil Yu, Seoul (KR); YuGyung Lee, Suwon-si (KR); Joon-Seo Yim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 401 days.

(21) Appl. No.: 17/868,434

(22) Filed: Jul. 19, 2022

(65) Prior Publication Data
US 2023/0060209 A1  Mar. 2, 2023

(30) Foreign Application Priority Data

Aug. 26, 2021 (KR) .................. 10-2021-0113481
Jan. 6, 2022 (KR) .................. 10-2022-0002228

(51) Int. Cl.
*G06T 7/00* (2017.01)
*G06T 5/20* (2006.01)
(Continued)

(52) U.S. Cl.
CPC .............. *G06T 7/0002* (2013.01); *G06T 5/20* (2013.01); *G06T 5/70* (2024.01); *G06T 7/11* (2017.01);
(Continued)

(58) Field of Classification Search
CPC ........... G06T 7/0002; G06T 5/20; G06T 5/70; G06T 7/11; G06T 7/37;
(Continued)

(56) References Cited

U.S. PATENT DOCUMENTS 9,025,910 B2  5/2015  Liu et al.
9,741,098 B2  8/2017  Cox
(Continued)

FOREIGN PATENT DOCUMENTS

CN  113240744 B  * 10/2024  ............... G06T 7/60
JP  4962159 B2    6/2012
(Continued)

OTHER PUBLICATIONS

Jeon, S., et al., "Generation of Reference Images using Filtered Radon Transform and Truncated SVD for Structural Artifacts", Society for Imaging Science and Technology, 2022, pp. 341-1-341-4.
(Continued)

*Primary Examiner* — Jose L Couso
(74) *Attorney, Agent, or Firm* — Sughrue Mion, PLLC

(57) ABSTRACT

An image evaluation method, including: obtaining a test image including a first lattice pattern formed by image edges; aligning the test image using the image edges to generate an aligned image including a second lattice pattern formed by aligned image edges; generating a compressed image by compressing the aligned image; and generating a quantified result by quantifying a per-pixel difference between the compressed image and the aligned image.

21 Claims, 10 Drawing Sheets

(51) Int. Cl.
*G06T 5/70* (2024.01)
*G06T 7/11* (2017.01)
*G06T 7/37* (2017.01)

(52) U.S. Cl.
CPC ...... *G06T 7/37* (2017.01); *G06T 2207/30168* (2013.01)

(58) Field of Classification Search
CPC . G06T 2207/30168; G06T 5/80; G06T 7/337; G06T 2207/10024; G06T 2207/20016; G06T 2207/20004; G06T 2207/20028; G06T 2207/20032; G06T 2207/20182; G06T 5/00; G06T 5/50; G06T 3/4015; G06T 7/80; G06T 9/00; G06F 18/22; G06F 3/0484; H04N 17/002; H04N 23/10; H04N 25/60; H04N 23/673; H04N 23/81; H04N 23/84; H04N 23/843; H04N 9/646; H04N 5/21
See application file for complete search history.

(56) References Cited

U.S. PATENT DOCUMENTS

| | | |
|---|---|---|
| 9,838,643 B1 | 12/2017 | Madhav et al. |
| 9,875,533 B2 | 1/2018 | Kato et al. |
| 10,038,862 B2 | 7/2018 | Yu |
| 11,171,167 B2 | 11/2021 | Uchida et al. |
| 2010/0283872 A1* | 11/2010 | Chan .......... G06T 7/33 348/241 |
| 2010/0283876 A1* | 11/2010 | Chan .......... G06T 5/70 348/E5.076 |
| 2020/0372682 A1 | 11/2020 | Kim et al. |

FOREIGN PATENT DOCUMENTS

| | | |
|---|---|---|
| KR | 10-1428364 B1 | 8/2014 |
| KR | 10-2019-0119029 A | 10/2019 |
| KR | 10-2020-0110255 A | 9/2020 |
| KR | 10-2020-0134374 A | 12/2020 |
| KR | 10-2020-0143894 A | 12/2020 |

OTHER PUBLICATIONS

Min, X., et al., "Blind Quality Assessment Based on Pseudo-Reference Image", IEEE Transactions on Multimedia, vol. 20, No. 8, Aug. 2018, pp. 2049-2062.

Kim et al., "Camera Image Quality Tradeoff Processing of Image Sensor Re-mosaic using Deep Neural Network", Society for Imaging Science and Technology, https://doi.org/10.2352/ISSN.2470-1173.2021.9.IQSP-206, 2021, (7 total pages).

* cited by examiner

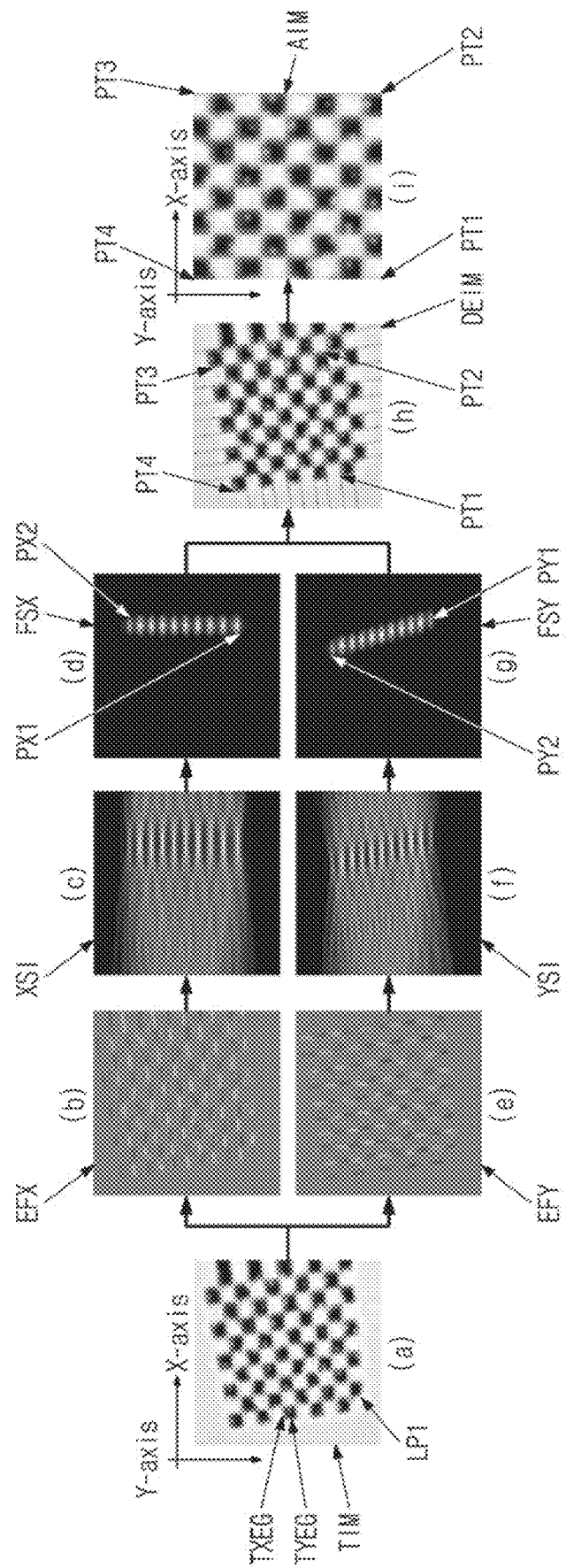

IMAGE EVALUATION METHOD THAT CAN QUANTIFY IMAGES DISTORTED BY ARTIFACTS, COMPUTER PROGRAM PERFORMING THE METHOD, AND COMPUTING DEVICE

CROSS-REFERENCE TO RELATED APPLICATIONS

This application claims priority under 35 U.S.C. § 119 to Korean Patent Application No. 10-2021-0113481 filed on Aug. 26, 2021, and Korean Patent Application No. 10-2022-0002228 filed on Jan. 6, 2022, in the Korean Intellectual Property Office, the disclosures of which are incorporated by reference herein in their entireties.

BACKGROUND

1. Field

The disclosure relates to a technology for optimizing parameters of an image signal processor by using image evaluation and an evaluation result, and more particularly, to an image evaluation method, a computer program, and a computing device capable of quantifying distortion of an image due to at least one of noise and artifacts, and optimizing the parameters of the image signal processor by using a quantified result.

2. Description of Related Art

An image processing device includes a complementary metal-oxide-semiconductor (CMOS) substrate on which light receiving elements (e.g., photodiodes) are formed, and a color filter array formed on the CMOS substrate.

The image processing device generates a color image by processing incomplete color image data corresponding to output signals of the light receiving elements that receive color signals passing through the color filter array.

In this case, the image processing device uses an image signal processor (ISP) for the purpose of generating a color image by processing incomplete color image data. However, when the ISP processes a high-frequency image (e.g., an image containing image edges whose brightness changes sharply or an image containing complex patterns), unexpected artifacts may be generated, thereby causing the degradation of quality of the image processed by the ISP.

SUMMARY

Provided are an image evaluation method capable of extracting an artifact-free reference image from a distorted image including a lattice pattern and quantifying (or express the quantify of) the distortion from a difference between the extracted reference image and the image, for the purpose of providing a reference making it possible to determine how well an image restored through the process of restoring an image is restored, a computer program performing the method, and a computing device executing the computer program.

Additional aspects will be set forth in part in the description which follows and, in part, will be apparent from the description, or may be learned by practice of the presented embodiments.

In accordance with an aspect of the disclosure, an image evaluation method includes obtaining a test image including a first lattice pattern formed by image edges; aligning the test image using the image edges to generate an aligned image including a second lattice pattern formed by aligned image edges; generating a compressed image by compressing the aligned image; and generating a quantified result by quantifying a per-pixel difference between the compressed image and the aligned image.

In accordance with an aspect of the disclosure, a computer-readable storage medium is configured to store instructions which, when executed by at least one processor, cause the at least one processor to: obtain a test image including a first lattice pattern formed by image edges; align the test image using the image edges to generate an aligned image including a second lattice pattern formed by aligned image edges: generate a compressed image by compressing the aligned image; and generate a quantified result by quantifying a per-pixel difference between the compressed image and the aligned image.

In accordance with an aspect of the disclosure, an image evaluation method includes obtaining a test image including a first lattice pattern formed by image edges, noise, and artifacts; aligning the test image using the image edges to generate an aligned image including a second lattice pattern formed by aligned image edges; removing the noise and the artifacts from the aligned image to generate a reference image including the second lattice pattern; and generating a quantified result by quantifying a per-pixel difference between the reference image and the aligned image.

In accordance with an aspect of the disclosure, a computer-readable storage medium is configured to store instructions which, when executed by at least one processor, cause the at least one processor to: obtain a test image including a first lattice pattern formed by image edges, noise, and artifacts; align the test image using the image edges to generate an aligned image including a second lattice pattern formed by aligned image edges; remove the noise and the artifacts from the aligned image to generate a reference image including the second lattice pattern; and generate a quantified result by quantifying a per-pixel difference between the reference image and the aligned image.

In accordance with an aspect of the disclosure, a computing device includes a memory device configured to store a test image including a first lattice pattern formed by image edges, noise, and artifacts; and a processor configured to evaluate the test image output from the memory device, wherein the processor is further configured to: align the test image using the image edges to generate an aligned image including a second lattice pattern formed by aligned image edges; remove the noise and the artifacts from the aligned image to generate a reference image including the second lattice pattern; and quantify a per-pixel difference between the reference image and the aligned image to generate a quantified result.

In accordance with an aspect of the disclosure, a computing device includes a memory device configured to store a test image including a first lattice pattern formed by image edges, wherein the test image is generated by an image signal processor based on first parameters; and at least one processor configured to: align the image edges to obtain aligned image edges; generate an aligned image including a second lattice pattern formed by the aligned image edges; generate a reference image by compressing the aligned image; generate second parameters based on a difference between the reference image and the aligned image.

BRIEF DESCRIPTION OF THE FIGURES

The above and other aspects, features, and advantages of certain embodiments of the present disclosure will be more apparent from the following description taken in conjunction with the accompanying drawings, in which:

FIG. 4 is a diagram describing a method for generating an aligned image according to an embodiment.

DETAILED DESCRIPTION

Figure 1:
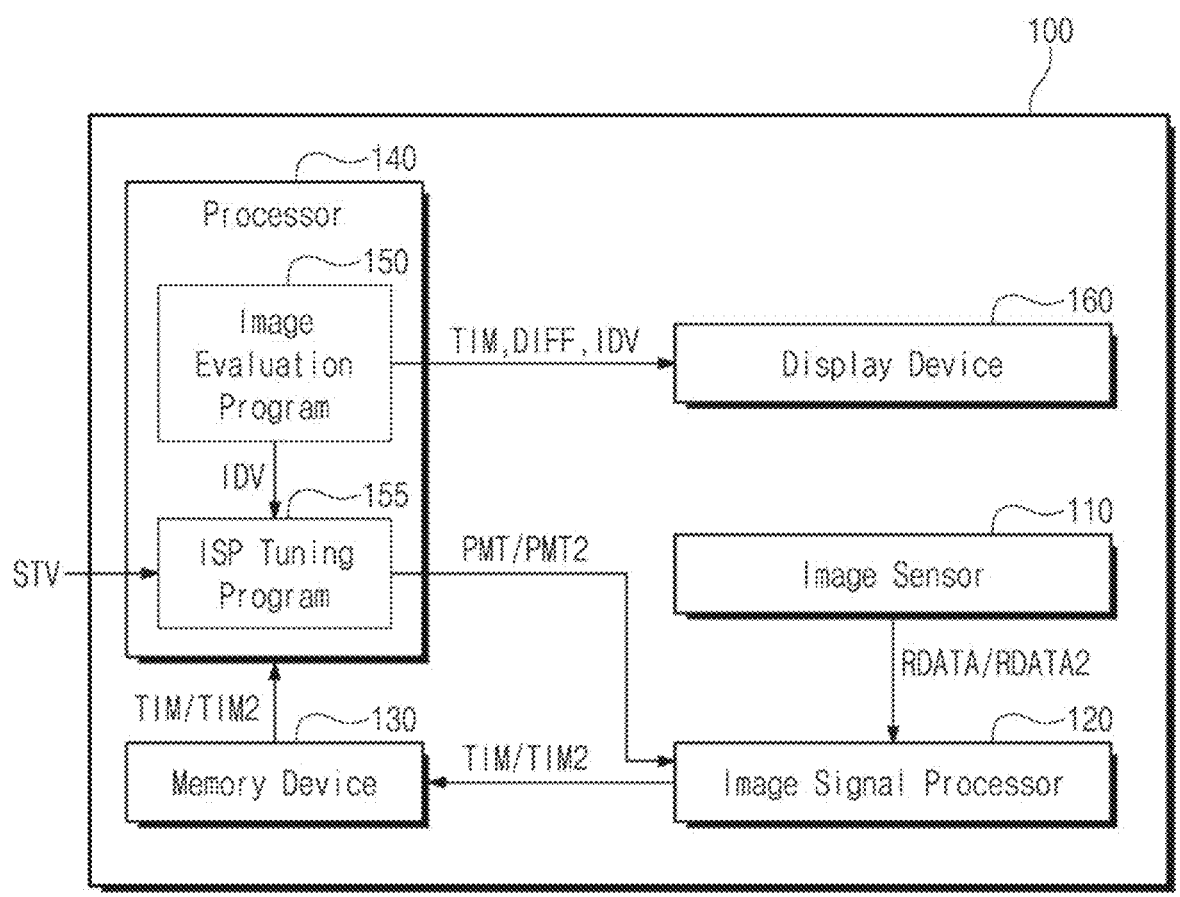
FIG. 1 is a block diagram of a computing device executing a computer program capable of performing an image evaluation method according to an embodiment.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

FIG. 1 is a block diagram of a computing device executing a computer program capable of performing an image evaluation method according to an embodiment of the present disclosure. Referring to FIG. 1, a computing device 100 includes an image sensor 110, an image signal processor (ISP) 120, a memory device 130, a processor 140, and a display device 160. In embodiments, one or more of the elements of the computing device 100 may be for example included in, or referred to as, a camera module.

The computing device 100 may be a personal computer (PC) or a mobile device, and the mobile device may be a smartphone, a laptop computer, a mobile Internet device (MID), a wearable computing device, a web server, or an image processing device including ISP 120.

The processor 140 executes an image evaluation computer program 150. The processor 140 may be a central processing unit (CPU) or an application processor. The image evaluation computer program 150 performs operations to be described with reference to FIGS. 2 to 5 for the purpose of evaluating or quantifying the performance of the ISP 120.

According to embodiments, the processor 140 may further execute an ISP tuning computer program 155. The ISP tuning computer program 155 performs a function of tuning the ISP 120 by using first parameters PMT, which may be for example pre-tuning parameters, a function of generating second parameters PMT2 by using a quantified result value IDV generated by the image evaluation computer program 150, and a function of tuning the ISP 120 again by using the second parameters PMT2. The first parameters PMT may be changed to or updated with the second parameters PMT2 by the processor 140.

Parameters of the ISP 120 may be optimized by the image evaluation computer program 150 and the ISP tuning computer program 155.

According to embodiments, the ISP tuning computer program 155 may set or program the first parameters PMT or the second parameters PMT2 to (or in) the ISP 120 by using setting values STV input from the outside or the quantified result value IDV generated by the image evaluation computer program 150.

The first parameters PMT may include at least two parameters of the following: a parameter for Bayer transformation, a parameter for demosaicing, a parameter for noise reduction, a parameter for image sharpening, a parameter for image blurting, a parameter for dead pixel correction, a parameter for black level compensation, a parameter for lens shading correction, a parameter for anti-aliasing noise filtering, a parameter for auto white balance (AWB) gain control, a parameter for gamma correction, a parameter for edge enhancement, a parameter for false color suppression, a parameter for hue/saturation control, and a parameter for brightness and contrast control.

Also, the second parameters PMT2 may include at least two of the parameters listed above.

The ISP 120 may process raw data RDATA or RDATA2 by using the above-listed functions corresponding to the parameters PMT or PMT2 and may generate an image TIM or TIM2 corresponding to a result of the processing.

The image evaluation computer program 150 may be recorded on or stored in a recording medium or storage medium readable by a computing device and may be connected with hardware (e.g., the processor 140) to evaluate the performance of the ISP 120 or quantify or express the quantity of distortion included in an image distorted by artifacts. In embodiments, the recording medium may be a non-transitory recording medium.

The ISP tuning computer program 155 is recorded on a recording medium readable by the computing device and is connected with the hardware to tune, set or optimize the parameters of the ISP 120. In embodiments the recording medium may be a non-transitory recording medium.

An example in which the image evaluation computer program 150 and the ISP tuning computer program 155 are independent computer programs is illustrated in FIG. 1, but the image evaluation computer program 150 performing an image evaluation function or a function of quantifying image distortion, and the ISP tuning computer program 155 performing a function of tuning the parameters of the ISP 120, may be implemented by one computer program.

The image sensor 110 generates the raw data RDATA or RDATA2 associated with an object, which may be for example a subject for photography. The image sensor 110 may be implemented with a complementary metal-oxide semiconductor (CMOS) image sensor.

Before tuning, the ISP 120 converts the first raw data RDATA output from the image sensor 110 into the test image TIM by using the first parameters PMT.

After the second parameters PMT2 corresponding to the quantified result value IDV are set in the ISP 120, the image sensor 110 generates the second raw data RDATA2 associated with the object. The ISP 120 converts the second raw data RDATA2 output from the image sensor 110 into a second test image TIM2 by using the second parameters PMT2.

The ISP 120 may process the raw data RDATA or RDATA2 by using the functions of the parameters PMT or PMT2, and may generate the test image TIM or TIM2 depending on a result of the processing. For example, the raw data RDATA or RDATA2 output from the image sensor 110 may be data having a Bayer format, and the test image TIM or TIM2 may be an image having an RGB format corresponding to an RGB color model, or an image having a YUV format corresponding to a YUV color model.

According to embodiments, the test image TIM or TIM2 may be stored in the memory device 130 and may then be transferred to the processor 140. In embodiments, the test image TIM or TIM2 may be directly transferred from the ISP 120 to the processor 140.

The display device 160 may display at least one of the test image TIM, a difference image DIFF, and the quantified result value IDV under control of the processor 140 or the image evaluation computer program 150. The quantified result value IDV may be a scalar value.

The display device 160 may be a light emitting diode (LED) display device, an organic light emitting diode (OLED) display device, or an active matrix OLED display device (AMOLED) display device.

Figure 2:
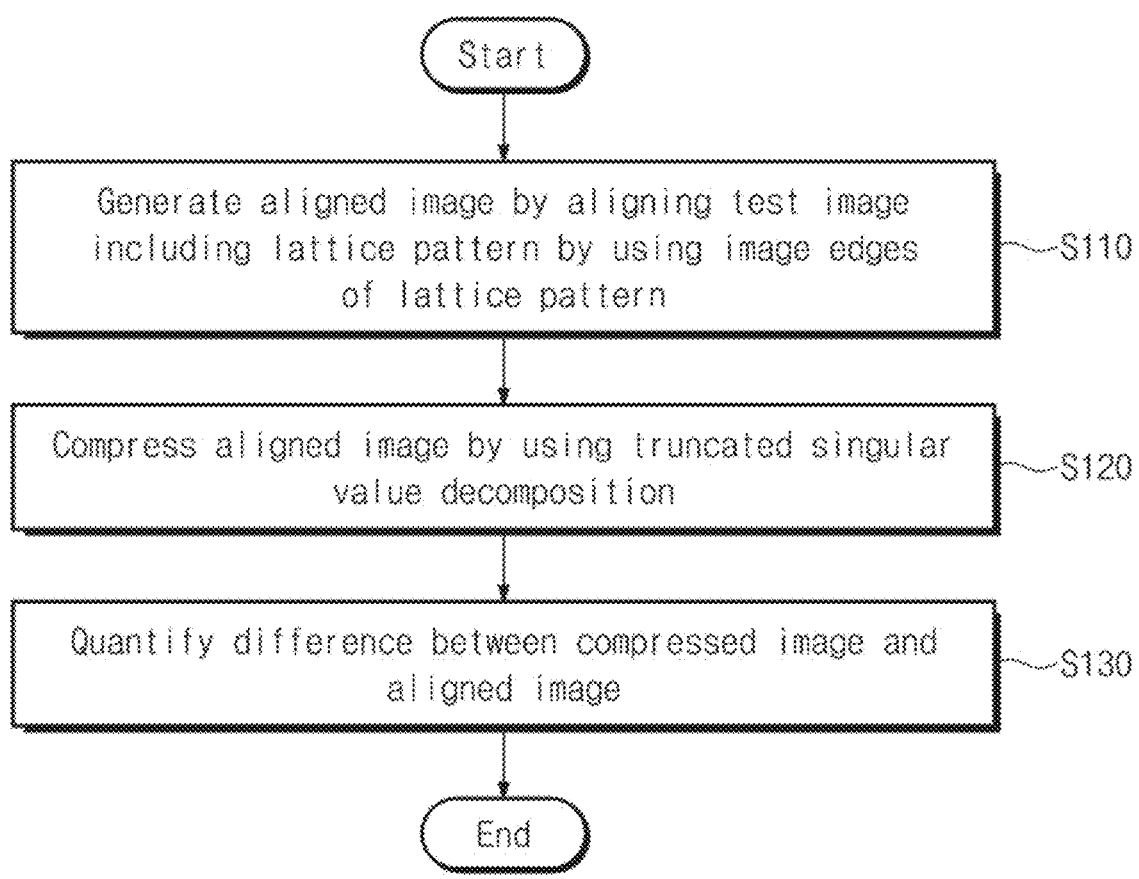
FIG. 2 is a flowchart describing an image evaluation method performed by an image evaluation computer program running on a computing device illustrated in FIG. 1, according to an embodiment.
Figure 3:
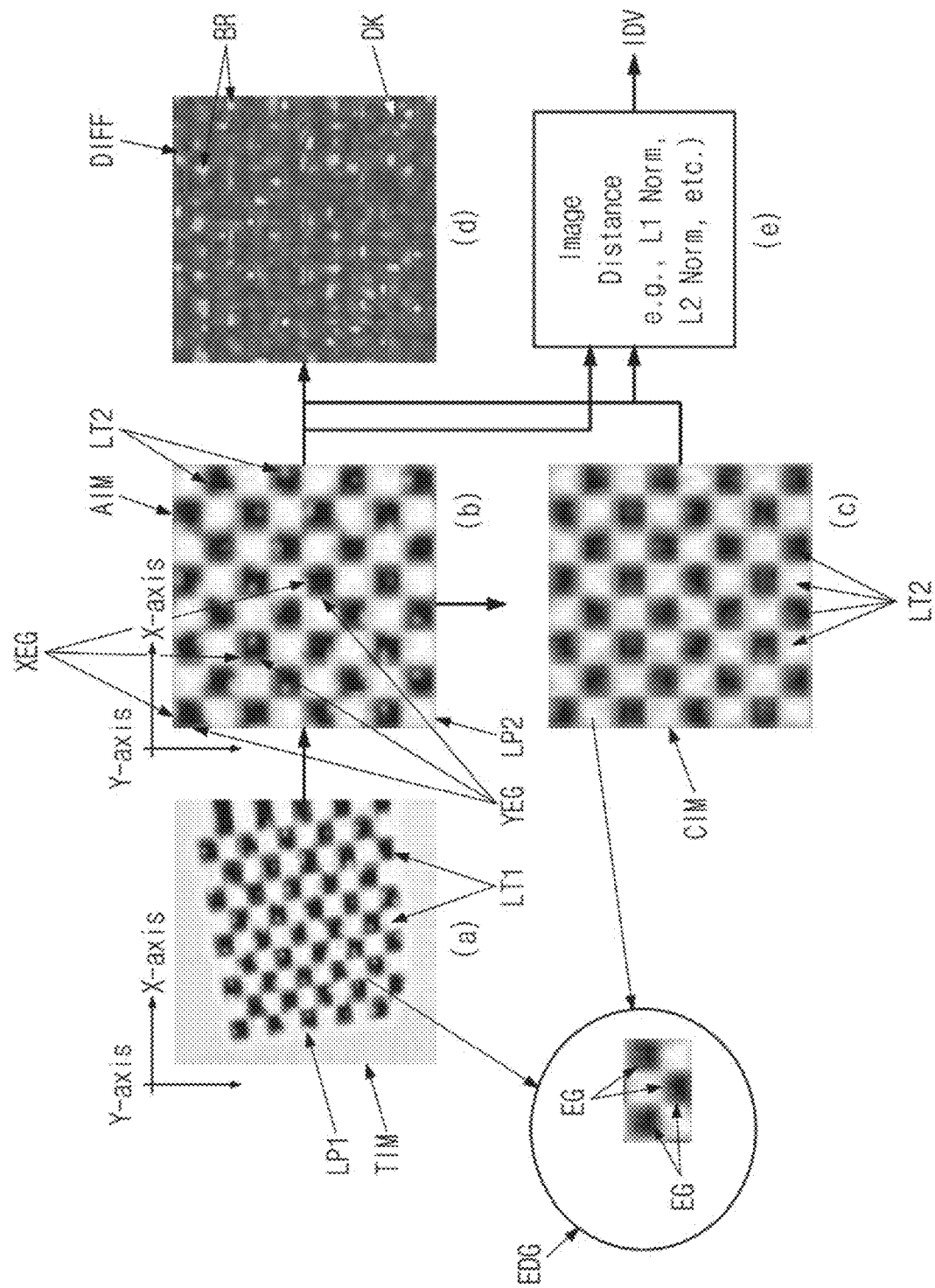
FIG. 3 is a conceptual diagram describing an image evaluation method according to an embodiment.

FIG. 2 is a flowchart describing an image evaluation method performed by an image evaluation computer program running on a computing device illustrated in FIG. 1, and FIG. 3 is a conceptual diagram describing an image evaluation method according to an embodiment of the present disclosure.

Before tuning, the ISP 120 converts the first raw data RDATA output from the image sensor 110 into the test image TIM by using the first parameters PMT.

Referring to FIGS. 1 and 2, and section (a) of FIG. 3, in operation S110, the image evaluation computer program 150 receives the est image TIM, which may be for example a chessboard image, from the memory device 130 or the ISP 120. As shown in section (a) of FIG. 3, the test image TIM may include a first lattice pattern LP1, in which first lattices LT1 formed by image edges are included. Referring to FIGS. 1 and 2, and section (b) of FIG. 3, image evaluation computer program 150 accurately aligns a portion or the whole of the test image TIM by using the image edges of the first lattice pattern LP1 included in the test image TIM, and generates an aligned image AIM including a second lattice pattern LP2 including second lattices LT2 depending on a result of the alignment.

In embodiments, an image edge, which may be referred to as a boundary line, may refer to a point or a boundary line at which image brightness of a digital image sharply changes, or a point or a boundary line having discontinuities. An oval EDG included in FIG. 3 illustrates example image edges EG included in each of images TIM, AIM, and CIM.

According to embodiments, the first lattice pattern LP1 may refer to a lattice pattern before alignment, and the second lattice pattern LP2 may refer to a lattice pattern after alignment.

The image evaluation computer program 150 aligns the image edges (e.g., TXEG and TYEG as shown in section (a) of FIG. 4) included in the first lattice pattern. LPI skewed on the test image TIM of section (a) of FIG. 3 such that the image edges are horizontal and vertical to each other as illustrated in section (b) of FIG. 3, and generates the aligned image AIM including the second lattice pattern LP2 in which the second lattices LT2 formed by aligned image edges XEG and YEG are included. The aligned image AIM may correspond to a portion or the whole of the test image TIM.

When viewed in an X-axis direction, which may be a horizontal direction, and a Y-axis direction, which may be a vertical direction, because the first lattice pattern LP1 included in the test image TIM illustrated in section (a) of FIG. 3 and section (a) of FIG. 4 is skewed, as illustrated in section (a) of FIG. 3, the first lattices LT1 may be different in size and shape.

For example, when the image sensor 110 photographing the object (e.g., a chessboard) including the first lattice pattern LP1 is not parallel to the object, the first lattice pattern LP1 of the test image TIM generated by the image sensor 110 may be skewed.

However, when viewed in the X-axis direction (or horizontal direction) and the Y-axis direction (or vertical direction), because the second lattice pattern LP2 of the aligned image AIM illustrated in section (b) of FIG. 3 is not skewed, the second lattices LT2 illustrated in section (b) of FIG. 3 are identical in size and shape. The second lattice pattern LP2 is a lattice pattern including image edges detected from the first lattice pattern LP1 through section (b) of FIG. 4 to section (i) of FIG. 4.

As illustrated in section (b) of FIG. 3, the second lattice pattern LP2 may include a plurality of second lattices LT2, the first image edges XEG arranged in the X-axis direction, and the second image edges YEG arranged in the Y-axis direction, and the first image edges XEG and the second image edges YEG are perpendicular to each other.

For example, the second lattice LT2 formed by two corresponding image edges of the first image edges XEG and two corresponding edges of the second image edges YEG is in the shape of a quadrangle. In embodiments, a lattice may be referred to as a cell, a mesh, or a grid.

The image evaluation computer program 150 may accurately align the test image TIM including the first lattice pattern LP1 by using Radon transform and may generate the aligned image AIM including the second lattice pattern LP2 formed as a result of the alignment.

The image evaluation computer program 150 may extract a quadrilateral region of interest ROI from the test image TIM, may warp the extracted quadrilateral ROI, and may generate the aligned image AIM including the second lattice pattern LP2 depending on a result of the warping. The warping is may be referred to as image warping.

FIG. 4 is a diagram describing a method for generating an aligned image according to an embodiment of the present disclosure.

The alignment may refer to a process of generating the aligned image AIM illustrated in section (i) of FIG. 4 from the test image TIM illustrated in section (a) of FIG. 4, and warping may refer to two processes including a process of obtaining four points PT1, PT2, PT3, and PT4 illustrated in section (h) of FIG. 4 and a process of generating the aligned image AIM illustrated in section (i) of FIG. 4.

Referring to FIGS. 1 to 4, the image evaluation computer program 150 detects the X-axis direction image edges TXEG and Y-axis direction image edges TYEG from the test image TIM including the first lattice pattern LP1 illustrated in section (a) of FIG. 4 by using at least one edge detection algorithm, which may be at least one of a plurality of edge detection algorithms. For example, the image evaluation computer program 150 detects image edges by performing edge filtering in the X-axis direction and edge filtering in the Y-axis direction on the test image TIM.

The edge filtering or the edge detection algorithm detects the image edges by determining whether the brightness and/or the intensity of an image changes sharply or dramatically.

Examples of edge detection algorithms include a Canny edge detector, a Sobel operator, a Laplace operator, a Prewitt operator, a Scharr operator, and the like, but are not limited thereto.

For example, the image evaluation computer program 150 may detect X-axis direction image edges and Y-axis direction image edges of each of the first lattices LT1 included in the first lattice pattern LP1 by applying the Sobel operator in each of the X-axis direction and the Y-axis direction. The Sobel operator is may be referred to as a Sobel-Feldman operator or a Sobel filter.

According to embodiments, section (b) of FIG. 4 illustrates an example image EFX including image edges detected in the X-axis direction with respect to the test image TIM by using an edge detection algorithm (e.g., the Sobel operator), and section (e) of FIG. 4 illustrates an example image EFY including image edges detected in the Y-axis direction with respect to the test image TIM by using the edge detection algorithm.

According to embodiments, section (c) of FIG. 4 illustrates an example X-axis direction sinogram XSI, and section (f) illustrates an example Y-axis direction sinogram YSI.

In embodiments, the image evaluation computer program 150 may create or calculate the X-axis direction sinogram XSI, which may correspond to the image EFX edge-filtered in the X-axis direction (as shown in section (b) of FIG. 4), and may create or calculate the Y-axis direction sinogram YSI, which may correspond to the image EFY edge-filtered in the Y-axis direction (as shown in section (e) of FIG. 4).

For example, the image evaluation computer program 150 that uses the Radon transform creates the X-axis direction sinogram XSI illustrated in section (c) of FIG. 4 from the image EFX edge-filtered in the X-axis direction and creates the Y-axis direction sinogram YSI illustrated in section (f) of FIG. 4 from the image EFY edge-filtered in the Y-axis direction.

The image evaluation computer program 150 filters the X-axis direction sinogram XSI to generate a first filtered sinogram FSX illustrated in section (d) of FIG. 4 and filters the Y-axis direction sinogram YSI to generate a second filtered sinogram FSY illustrated in section (g) of FIG. 4.

For example, the image evaluation computer program 150 creates the first filtered sinogram FSX by extracting points, each of which has a high intensity, from among points arranged in each row of the X-axis direction sinogram XSI and creates the second filtered sinogram FSY by extracting points, each of which has a high intensity, from among points arranged in each row of the Y-axis direction sinogram YSI. In embodiments, a high intensity may refer to, for example, a highest intensity from among intensities, or a relatively high intensity in comparison with other intensities.

Section (h) of FIG. 4 illustrates an image DEIM including image edges detected from the test image TIM by using an edge detection algorithm. The image evaluation computer program 150 generates the image DEIM including the image edges detected from the test image TIM by using the first filtered sinogram FSX illustrated in section (d) of FIG. 4 and the second filtered sinogram FSY illustrated in section (g) of FIG. 4.

The image evaluation computer program 150 generates the image DEIM including the four points PT1, PT2, PT3, and PT4 by using two points PX1 and PX2 of points included in the first filtered sinogram FSX and two points PY1 and PY2 included in the second filtered sinogram FSY.

For example, the image evaluation computer program 150 determines the first point PT1 by using the two points PX1 and PY1, determines the second point PT2 by using the two points PX1 and PY2, determines the third point PT3 by using the two points PX2 and PY2, and determines the fourth point PT4 by using the two points PX2 and PY1.

The image evaluation computer program 150 warps the image DEIM including the detected image edges by using the four points PT1, PT2, PT3, and PT4 and generates the aligned image AIM including the four points PT1, PT2, PT3, and PT4 depending on a result of the warping.

For example, referring to section (b) of FIG. 3, to generate the aligned image AIM including the second lattice pattern LP2 composed of 8×8 lattices LT2, the image evaluation computer program 150 may select the two first points PX1 and PX2 from a first group of points of the first filtered sinogram FSX, may select the two second points PY1 and PY2 from a second group of points of the second filtered sinogram FSY, and may generate the image DEIM including the four points PT1, PT2, PT3, and PT4 selected.

For example, each point included in the first filtered sinogram FSX illustrated in section (d) of FIG. 4 and each point included in the second filtered sinogram FSY illustrated in section (g) of FIG. 4 may correspond to image edges in the actual image DEIM or AIM, respectively.

For example, when the first point PX1 is the lowest point of a first group of points, the first point PX2 is the highest point of the first group of points, the second point PYI is the lowest point of a second group of points, the second point PY2 is the highest point of the second group of points, then the image DEM including the four points PT1, PT2, PT3, and PT4 has the largest size compared to images each including four different points.

A size of a quadrilateral ROI targeted for warping is determined depending on whether the image evaluation computer program 150 selects any two first points from a first group of points and selects any two second points from a second group of points.

For example, based on the image evaluation computer program 150 selecting two first points from the remaining points other than the lowest point and the highest point of a first group of points, and selecting two second points from the remaining points other than the lowest point and the highest point of a second group of points, the image evaluation computer program 150 extracts a quadrilateral ROI corresponding to the four points thus selected, and warps the extracted quadrilateral ROI to generate the aligned image AIM.

Returning to FIG. 3, in operation S120, the image evaluation computer program 150 compresses the image AIM aligned through operation S110 by using truncated singular value decomposition and generates the compressed image CIM including the second lattice pattern LP2 formed by the second lattices LT2 illustrated in section (c) of FIG. 3.

Each of the test image TIM and the aligned image AIM may be an image distorted by noise and artifacts, but the compressed image CIM may be an image which does not include the noise and artifacts, that is, a distortion-free image.

Image distortion includes distortion in which a shape (e.g., a lattice pattern) changes depending on an image viewing angle, and distortion in which an outline, a contour, or a boundary line of an image edge or a two-dimensional point (or an apex in a three-dimensional image) is unclear due to imperfect performance of the ISP 120.

In operation S130, the image evaluation computer program 150 quantifies a difference between the compressed image CIM illustrated in section (c) of FIG. 3 and the aligned image AIM illustrated in section (b) of FIG. 3 in units of a pixel and generates the difference image DIFF and the quantified result value IDV depending on a quantified result. In embodiments, quantifying a difference in units of a pixel may mean determining or calculating a difference for each pixel, or for example determining or calculating a per-pixel difference.

Figure 5A:
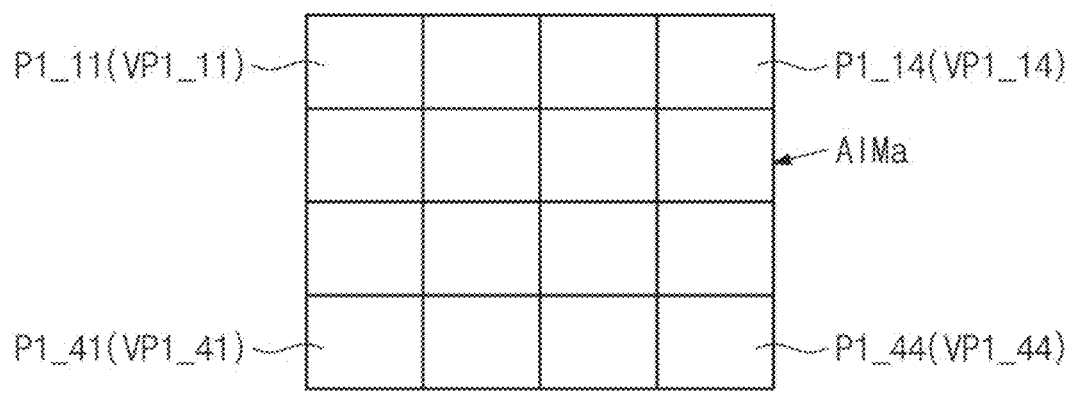
FIG. 5A and FIG. 5B are conceptual diagrams illustrating a method for quantifying a difference between a compressed image and an aligned image for each pixel, according to an embodiment.
Figure 5B:
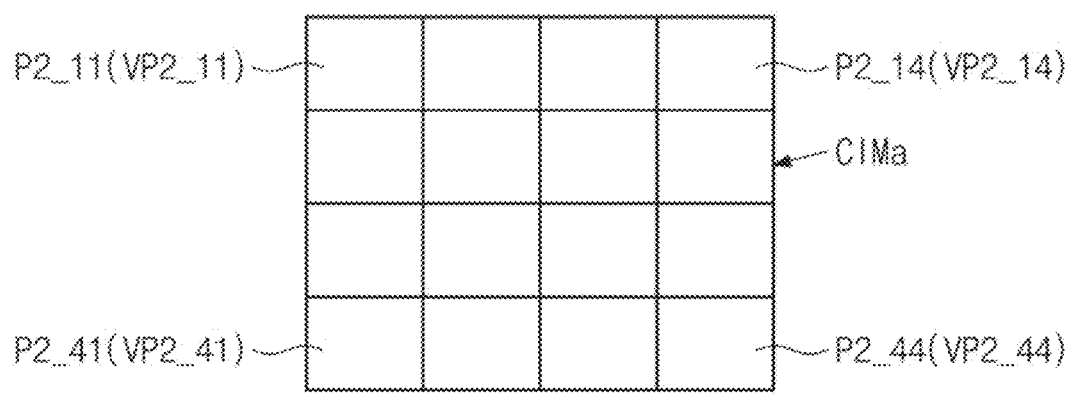

FIGS. 5A and 5B are a conceptual diagrams illustrating a method for quantifying a difference between a compressed image and an aligned image for each pixel.

In embodiments, an aligned image AIMa illustrated in FIG. 5A may be an image including 4×4 pixels and a compressed image CIMa illustrated in FIG. 5B may be an image including 4×4 pixels. The aligned image AIMa including the 4×4 pixels may correspond to a portion of the aligned image AIM illustrated in section (b) of FIG. 3, and the compressed image CIMa including the 4×4 pixels may correspond to a portion of the compressed image CIM illustrated in section (c) of FIG. 3.

The image evaluation computer program 150 calculates a difference between pixel values of pixels targeted for comparison in units of a pixel.

A pixel is the smallest element of an image. Each pixel corresponds to one pixel value.

For example, in an 8-bit gray scale image, a pixel value (i.e., a value of a pixel) ranges in value from 0 to 255. A pixel value at each point corresponds to the intensity of light photons striking each point. Each pixel has a value that is proportional to a light intensity measured or received at a corresponding location.

In embodiments, a pixel value is not limited to the above definition, and may be defined in a different manner. However, for convenience of description, each of the images CIM, CIMa, AIM, and AIMa may be described herein as an 8-bit gray scale image.

As illustrated in FIGS. 5A and 5B as an example, the image evaluation computer program 150 calculates differences between pixel values of the 16 pixels included in the compressed image CIM and pixel values of the 16 pixels included in the aligned image AIMa in a pixelwise manner, and thus, 16 difference values are generated.

For example, the image evaluation computer program 150 calculates a difference between a pixel value VP2_11 of a pixel P2_11 and a pixel value VP1_11 of a pixel P1_11, a difference between a pixel value VP2_14 of a pixel P2_14 and a pixel value VP1_14 of a pixel P1_14, a difference between a pixel value VP2_41 of a pixel P2_41 and a pixel value VP1_41 of a pixel P1_41, and a difference between a pixel value VP2_44 of a pixel P2_44 and a pixel value VP1_44 of a pixel P1_44.

For convenience of description, the method for calculating 4 differences is described above as an example, but a method for calculating 12 differences, which is not described, may be sufficiently understood from the method for calculating 4 differences.

The image evaluation computer program 150 calculates the differences between pixel values of pixels included in the compressed image CIM and pixel values of pixels included in the aligned image AIM in units of a pixel and generates the difference image DIFF by using the differences.

Referring to section (d) of FIG. 3, the image evaluation computer program 150 generates the difference image DIFF including the differences calculated in units of a pixel.

The difference image DIFF includes bright points BR and dark points DK.

Each of the bright points BR indicates that a calculated difference between corresponding pixel values is relatively large, and each of the dark points DK indicates that a calculated difference between corresponding pixel values is relatively small.

The difference image MIT illustrated in section (d) of FIG. 3 is expressed by using a black and white image, but in embodiments the image evaluation computer program 150 may express the difference image DIFF by using a color image.

When the image evaluation computer program 150 expresses the difference image DIFF by using a color image, the image evaluation computer program 150 may increase brightness of a corresponding point as a difference between two corresponding pixel values increases and may decrease brightness of a corresponding point as a difference between two corresponding pixel values decreases.

For example, as the brightness of a bright point BR becomes brighter, the degree of image distortion corresponding to the bright point BR becomes larger; as the brightness of a dark point DK becomes darker, the degree of image distortion corresponding to the dark point DK becomes smaller.

The image evaluation computer program 150 calculates the differences between the pixel values of the pixels included in the compressed image CIM and the pixel values of the pixels included in the aligned image AIM in units of a pixel and generates the quantified result value IDV by using the differences.

Referring to section (e) of FIG. 3, the image evaluation computer program 150 generates the quantified result value IDV, which may be referred to as an image distance, by using the differences calculated in units of a pixel.

For example, the image evaluation computer program 150 generates the quantified result value IDV by quantifying the differences between the pixel values of the pixels included in the compressed image CIM and the pixel values of the pixels included in the aligned image AIM in units of a pixel by using the L1 norm, L2 norm, or structural similarity index measure (SSIM).

The L1 norm may also be referred to as the Manhattan distance or Taxicab geometry, and the L2 norm may also be referred to as the Euclidean distance.

That is, the image evaluation computer program 150 may generate the quantified result value IDV having a scalar value by using the L1 norm, L2 norm, or SSIM.

In operation S130, the image evaluation computer program 150 may generate at least one of the difference image DIFF and the quantified result value IDV based on a difference between two corresponding pixel values, as described with reference to FIGS. 5A and 5B.

The image evaluation computer program 150 may send at least one of the test image TIM, the difference image DIFF, and the quantified result value IDV to the display device 160, and the display device 160 may display at least one of the test image TIM, the difference image DIFF, and the quantified result value IDV. Accordingly, the user of the computing device 100 may visually see at least one of the test image TIM, the difference image DIFF, and the quantified result value IDV through the display device 160.

The ISP tuning computer program 155 may receive the quantified result value IDV generated by the image evaluation computer program 150, may generate the second parameters PMT2 by using the quantified result value IDV, and may tune the ISP 120 by using the second parameters PMT2. Accordingly, the first parameters PMT set in the ISP 120 are updated with the second parameters PMT2.

After the second parameters PMT2 are set in the ISP 120 (or are programmed or updated in the ISP 120), the image sensor 110 photographs an object to generate the second raw data RDATA2.

The ISP 120 receives the second raw data RDATA2, processes the second raw data RDATA2 by using the second parameters PMT2, and generates the second test image TIM2 corresponding to a processing result. The second test image TIM2 may be sent to the memory device 130 or the image evaluation computer program 150.

The image evaluation computer program 150 generates a difference image and/or a quantified result value from the second test image TIM2 using the method described with reference to FIGS. 1 to 5B. The ISP tuning computer program 155 may generate third parameters by using the quantified result value and may update the second parameters PMT2 set in the ISP 120 with the third parameters.

For example, the image evaluation computer program 150 may generate the aligned image AIM including the second lattice pattern LP2 formed by the aligned image edges XEG and YEG by aligning the test image TIM including the first lattice pattern LP1 including the first lattices LT1 formed by the image edges TXEG and TYEG, noise, and artifacts in operation S110, may generate the reference image, which may correspond to the compressed image CLM, including only the second lattice pattern LP2 by removing the noise and artifacts among the noise, the artifacts, and the second lattice pattern LP2 included in the aligned image AIM in operation S120, and may generate a quantified result (e.g., the difference image DIFF and/or the quantified result value IDV) by quantifying differences of the reference image and the aligned image AIM in units of a pixel in operation S130.

In other words, the image evaluation computer program 150 may generate the aligned image AIM by using one source image TIM, may generate the compressed image by compressing the aligned image AIM, and may generate a quantified result (e.g., the difference image DIFF and/or the quantified result value IDV) by quantifying differences of the reference image and the aligned image AIM in units of a pixel by using the compressed image CLM as a reference image from which the image distortion is absent. Accordingly, the image evaluation computer program 150 may quantify the degree of image distortion of the test image TIM and may generate a quantified result (e.g., the difference image DIFF and/or the quantified result value IDV).

Figure 6:
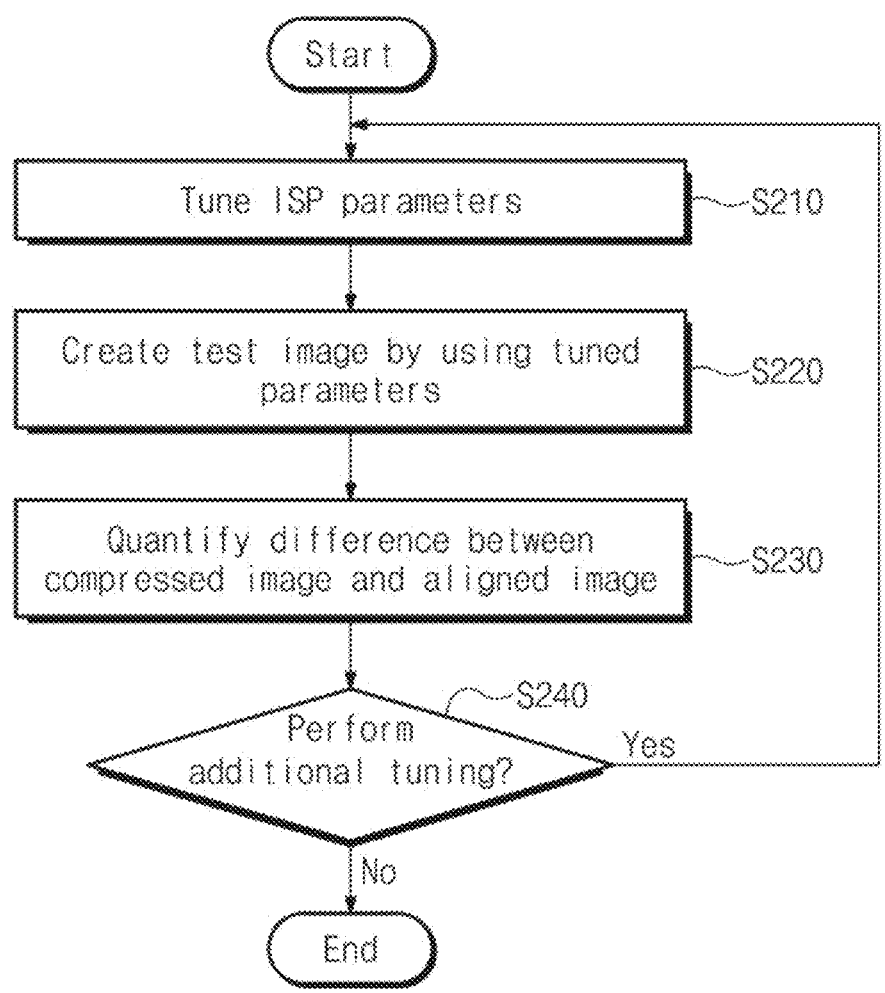
FIG. 6 is a flowchart describing an image evaluation method and a method for tuning parameters of an image processing processor by using the image evaluation method, according to an embodiment.

FIG. 6 is a flowchart describing an image evaluation method and a method for tuning parameters of an image processing processor by using the image evaluation method, according to an embodiment of the present disclosure.

Referring to FIGS. 1 to 6, in operation S210, the image evaluation computer program 150 tunes the ISP 120 by using the first parameters PMT before testing the performance of the ISP 120.

In operation S220, the ISP 120 receives the first raw data RDATA from the image sensor 110 and converts the first raw data RDATA into the test image TIM by using the first parameters PMT.

In operation S230, the image evaluation computer program 150 quantifies a difference between the compressed image CIM and the aligned image AIM in units of a pixel and may generate a quantified result (e.g., the difference image DIFF and/or the quantified result value IDV).

According to embodiments, the user of the computing device 100 may visually check the difference image DIFF and/or the quantified result value IDV displayed through the display device 160 and may decide whether to perform additional ISP tuning.

When the user of the computing device 100 inputs setting values STV indicating additional tuning for the ISP 120 to the ISP tuning computer program 155 by using an input device (e.g., a keyboard or a touch screen) (Yes in operation S240), in operation S210, the ISP tuning computer program 155 may generate the second parameters PMT2 corresponding to the setting values STV and may tune the ISP 120 by using the second parameters PMT2.

When the user of the computing device 100 inputs the setting values STV, which indicate that the additional tuning for the ISP 120 is not required, to the ISP tuning computer program 155 by using the input device (No in operation S240), the ISP tuning computer program 155 may terminate the method in response to the setting values STV.

According to embodiments, the ISP tuning computer program 155 may compare the quantified result value DV output from the image evaluation computer program 150 with a reference value in operation S240; depending on a comparison result (Yes in operation S240 or No in operation S240), the ISP tuning computer program 155 may continue to perform the tuning on the ISP 120 in operation S210 or may terminate the method.

According to embodiments, the ISP tuning computer program 155 may be programmed to generate the second parameters PMT2 corresponding to the quantified result value IDV when the quantified result value IDV is greater than the reference value.

However, according to embodiments, the ISP tuning computer program 155 may be programmed to generate the second parameters PMT2 corresponding to the quantified result value IDV when the quantified result value IDV is smaller than the reference value.

In operation S240, the ISP tuning computer program 155 determines whether to perform additional tuning on the ISP 120 by using the setting values STV input by the user or the quantified result value IDV output from the image evaluation computer program 150.

When the additional tuning is required (Yes in operation S240), in operation S210, the ISP tuning computer program 155 generates the second parameters PMT2 by using the setting values STV or the quantified result value IDV and tunes the ISP 120 by using the second parameters PMT2.

However, when the additional tuning is not required (No in operation S240), the ISP tuning computer program 155 may terminate the method.

After the ISP 120 is tuned based on the second parameters PMT2, in operation S220, the ISP 120 receives the second raw data RDATA2 from the image sensor 110 and converts the second raw data RDATA2 into the second test image TIM2 by using the second raw data RDATA2.

In operation S230, the image evaluation computer program 150 generates an aligned image from the second test image TIM2 as described with reference to (b) of FIG. 3, generates a compressed image from the aligned image as described with reference to (c) of FIG. 3, quantifies a difference between the compressed image and the aligned image in units of a pixel as described with reference to section (d) and section (e) of FIG. 3, and generates a difference image and a quantified result value corresponding to a quantifying result.

In operation S240, the image evaluation computer program 150 determines whether to perform additional tuning for the ISP 120, for example by determining whether the additional tuning is required or otherwise desired. For example, in embodiments the image evaluation computer program 150 may determine whether to perform additional tuning by comparing a difference corresponding to the difference image to a threshold difference, or by comparing the quantified result value to a threshold value. When the image evaluation computer program 150 determines to perform additional tuning for the ISP 120 (Yes in operation S240), in operation S210, the ISP tuning computer program 155 receives a quantified result value from the image evaluation computer program 150, generates third parameters by using the quantified result, value, and again tunes the ISP 120 by using the third parameters. When the image evaluation computer program 150 determines not to perform the additional tuning (No in operation S240), the ISP tuning computer program 155 may terminate the method.

Operation S210 to operation S240 of FIG. 6 may be repeatedly performed until it is determined not, to additionally tune the ISP 120, for example until there is no need to additionally tune the ISP 120, or for example until optimal parameters are set in the ISP 120.

FIGS. 7 to 10 are block diagrams of image evaluation systems, according to embodiments. In embodiments, one or more of the ISP 340, the ISP 341, and the ISP 520 may correspond to the ISP 120 discussed above. In embodiments, the display device 350 may correspond to the display device 160 discussed above. In embodiments, the image sensor 310 may correspond to the image sensor 110 discussed above. In embodiments, one or more of the processor 320, the processor 321, and the processor 530 may correspond to the processor 140 discussed above. In embodiments, the memory device 305 may correspond to the memory device 130 discussed above discussed above.

Figure 7:
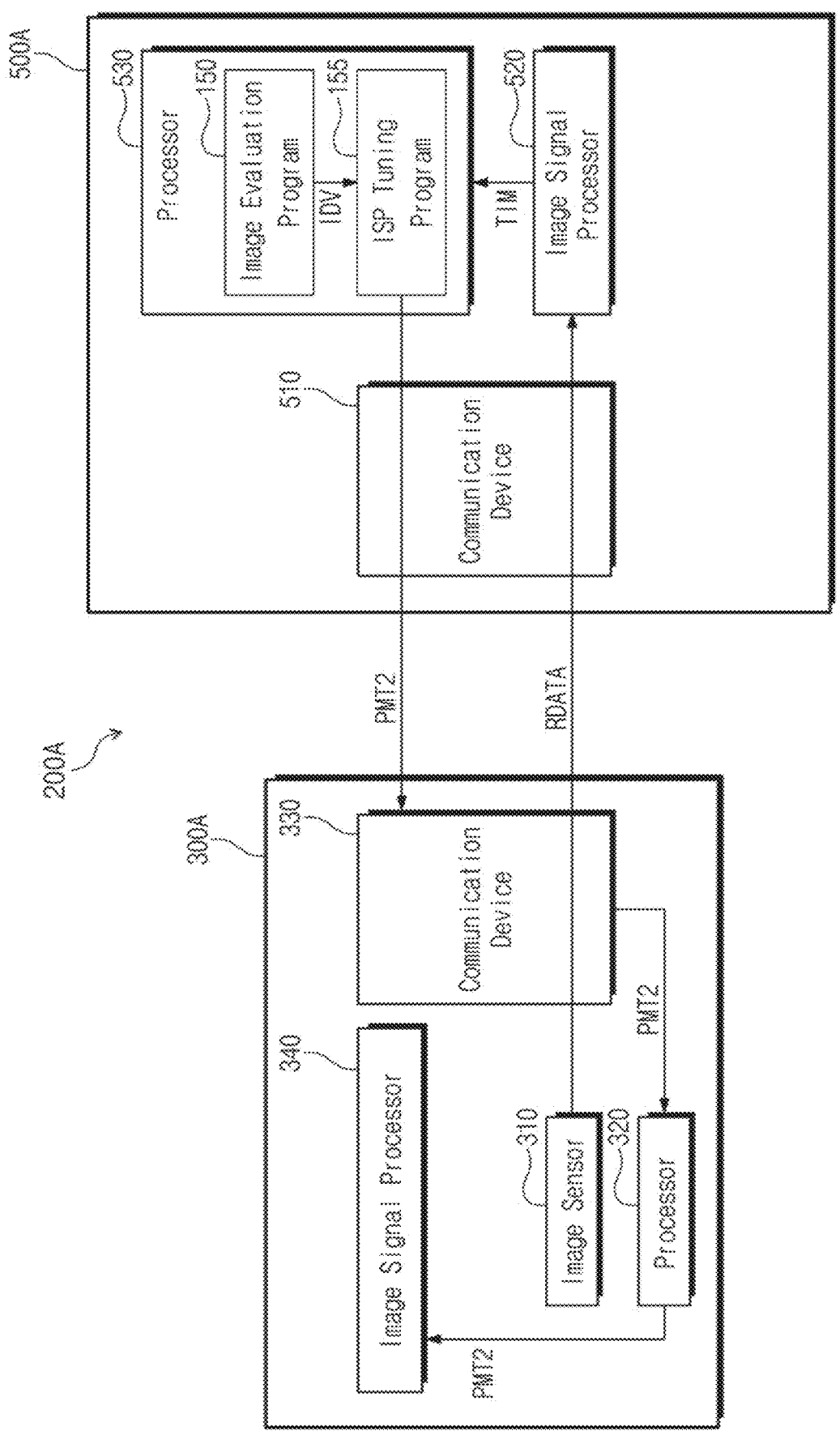
FIG. 7 is a block diagram of an image evaluation system in which parameters corresponding to a quantified result and raw data are exchanged over an Internet, according to an embodiment.

FIG. 7 is a block diagram of an image evaluation system in which parameters corresponding to a quantified result and raw data are exchanged over an Internet, according to an embodiment of the present disclosure.

Referring to FIG. 7, an image evaluation system 200A includes a computing device 300A and a server 500A communicating with each other over a communication network. The server 500A may be a computing device that executes the image evaluation computer program 150 performing an image evaluation operation, and the ISP tuning computer program 155 generating the parameters PMT2 for tuning an ISP 340 included in the computing device 300A.

The communication network to be described FIGS. 7 to 10 may be an Internet or a Wi-Fi network.

The raw data RDATA output from image sensor 310, which may be for example a digital camera, are sent to a communication device 510 of the server 500A over a communication device 330 and the communication network, under control of a processor 320.

An ISP 520 of the server 500A may be tuned by parameters, and the ISP 520 converts the raw data RDATA from the computing device 300A into the test image TIM by using the parameters.

The image evaluation computer program 150 executed by a processor 530 of the server 500A generates the quantified result value IDV. The ISP tuning computer program 155 generates the parameters PMT2 by using the quantified result value IDV generated by the image evaluation computer program 150 and sends the parameters PMT2 to the communication device 330 of the computing device 300A using a communication device 510 and the communication network. The processor 320 of the computing device 300A tunes the ISP 340 of the computing device 300A by using the parameters PMT2 received through the communication device 330. The ISP 340 tuned by the parameters PMT2 may convert raw data output from the digital camera 310 into an image by using the parameters PMT2.

Figure 8:
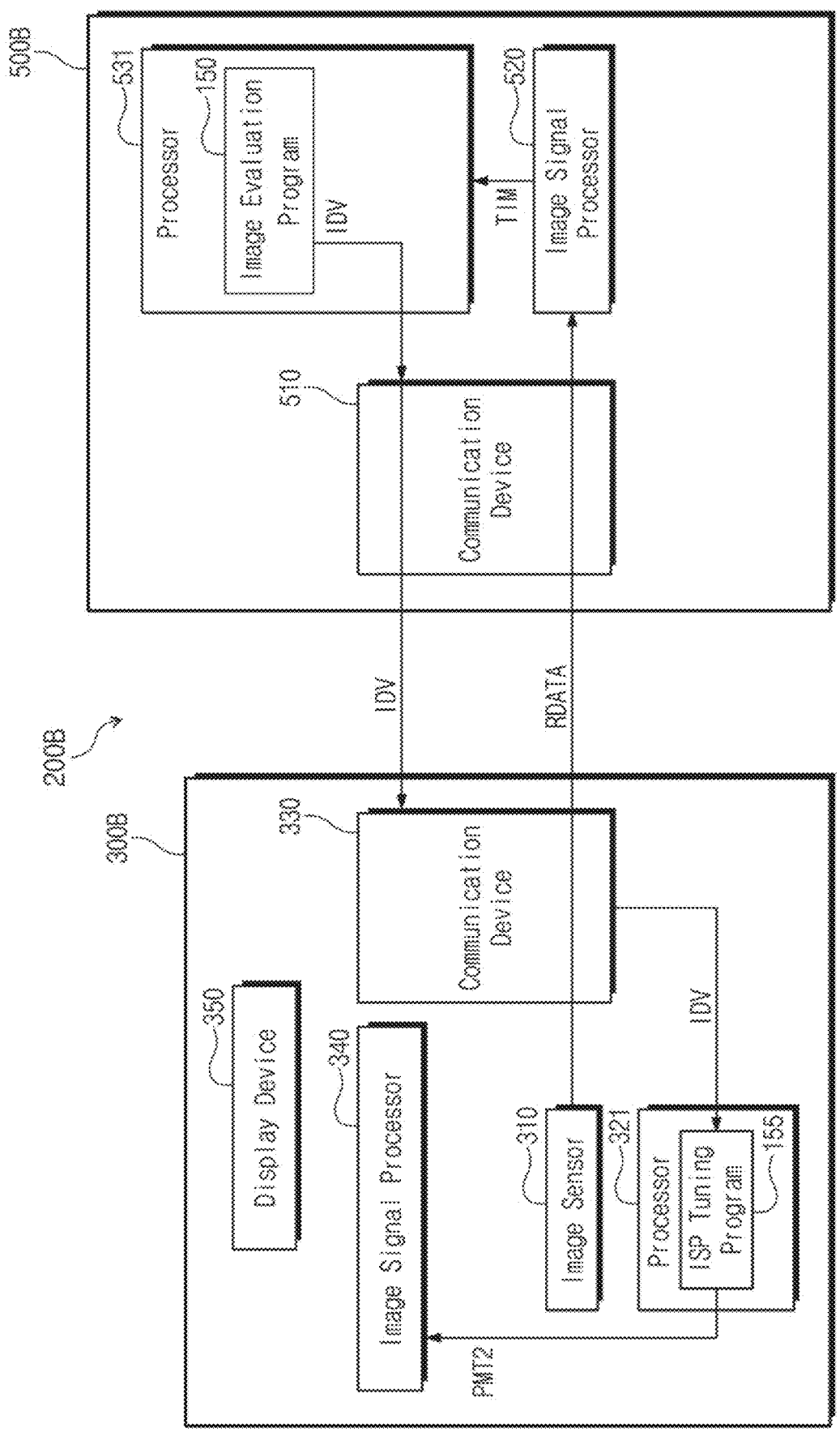
FIG. 8 is a block diagram of an image evaluation system in which raw data and a quantified result are exchanged over an Internet, according to an embodiment.

FIG. 8 is a block diagram of an image evaluation system in which raw data and a quantified result are exchanged over an Internet, according to an embodiment of the present disclosure.

Referring to FIG. 8, an image evaluation system 200B includes a computing device 300B and a server 500B communicating with each other over the communication network. The server 500B may be a computing device that executes the image evaluation computer program 150 performing an image evaluation operation.

The raw data RDATA output from the image sensor 310, which may be for example a digital camera, are sent to the communication device 510 of the server 500B over the communication device 330 and the communication network, under control of a processor 321.

The ISP 520 of the server 500B may be tuned by parameters, and the ISP 520 converts the raw data RDATA from the computing device 300B into the test image TIM by using the parameters.

The image evaluation computer program 150 executed by a processor 531 of the server 500B generates the quantified result value IDV. The quantified result value IDV is sent to the communication device 330 of the computing device 300B over the communication device 510 and the communication network.

The ISP tuning computer program 155 executed by the processor 321 of the computing device 300B generates the parameters PMT2 by using the quantified result value IDV received through the communication device 330 and tunes the ISP 340 of the computing device 300B by using the parameters PMT2. The ISP 340 tuned by the parameters PMT2 may convert raw data output from the digital camera 310 into an image by using the parameters PMT2. The quantified result value IDV may be displayed on a display device 350 under control of the processor 321.

Figure 9:
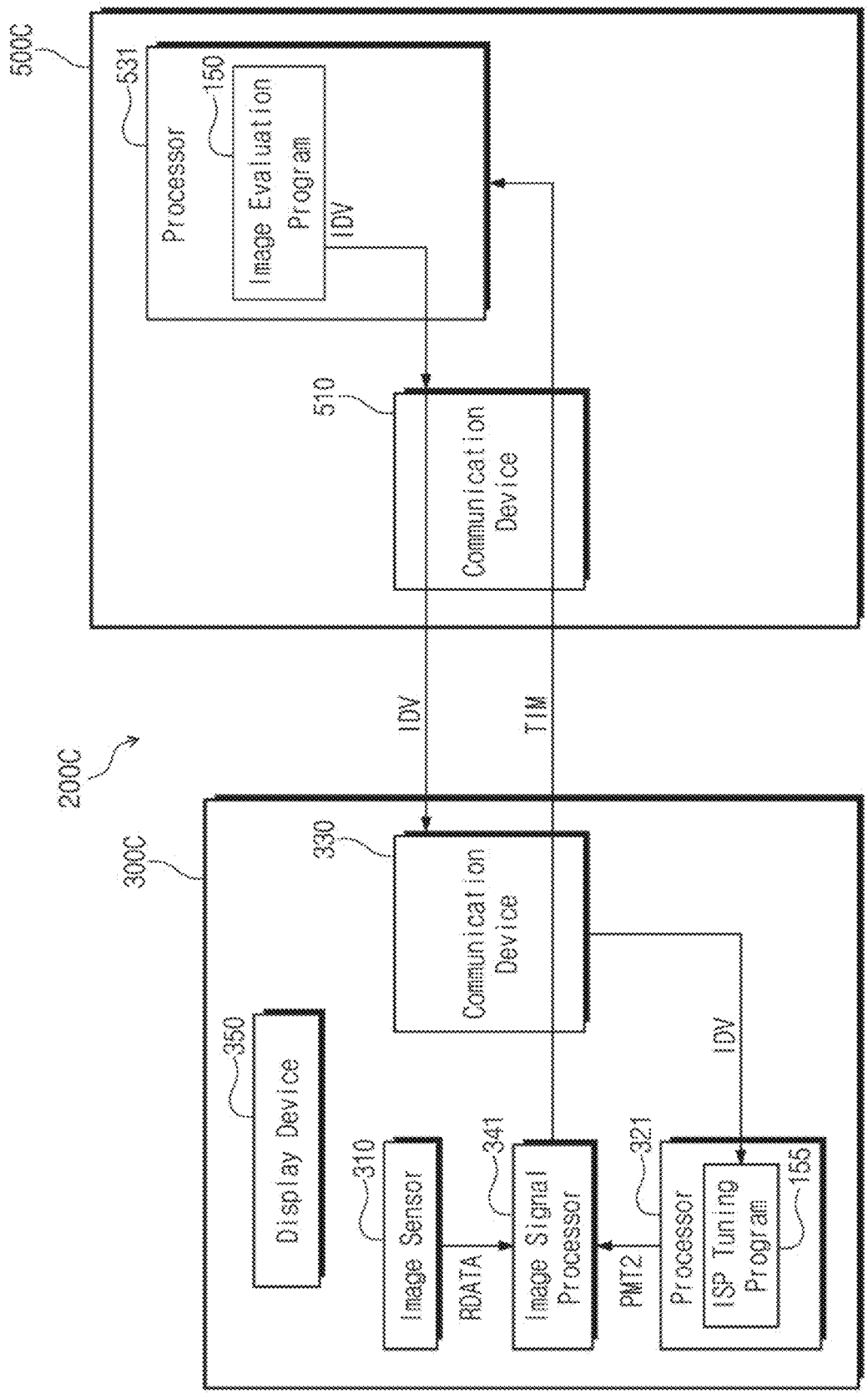
FIG. 9 is a block diagram of an image evaluation system in which a test image generated by an image processing processor and a quantified result are exchanged over an Internet, according to an embodiment.

FIG. 9 is a block diagram of an image evaluation system in which a test image generated by an image processing processor and a quantified result are exchanged over an Internet, according to an embodiment of the present disclosure.

Referring to FIG. 9, an image evaluation system 200C includes a computing device 300C and a server 500C communicating with each other over the communication network. The server 500C may be a computing device that executes the image evaluation computer program 150 performing an image evaluation operation.

The raw data RDATA output from the or image sensor 310, which may be for example a digital camera, are sent to an ISP 341. The ISP 341 tuned by the first parameters PMT receives the raw data RDATA and converts the raw data RDATA into the test image TIM by using the first parameters PMT.

The test image TIM is sent to the communication device 510 of the server 500C through the communication device 330 and the communication network, under control of the processor 321.

The image evaluation computer program 150 executed by the processor 531 of the server 500C processes the test image TIM to generate the quantified result value IDV. The quantified result value IDV is sent to the communication device 330 of the computing device 300C over the communication device 510 and the communication network.

The ISP tuning computer program 155 executed by the processor 321 of the computing device 300C generates the parameters PMT2 by using the quantified result value IDV received through the communication device 330 and tunes the ISP 341 of the computing device 300C by using the parameters PMT2. The ISP 341 tuned by the second parameters PMT2 may convert raw data output from the digital camera 310 into an image by using the second parameters PMT2. The quantified result value IDV may be displayed on the display device 350 under control of the processor 321.

Figure 10:
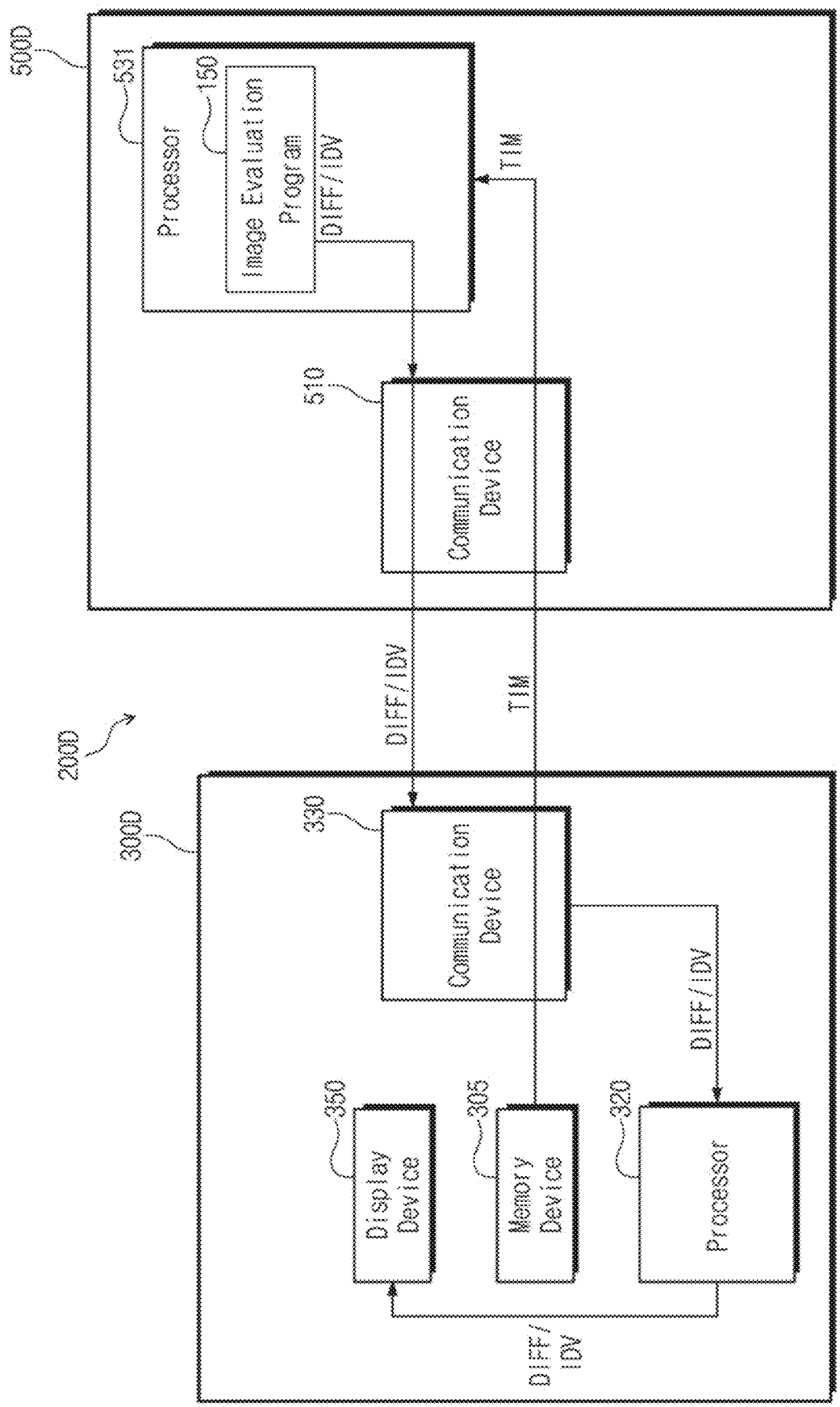
FIG. 10 is a block diagram of an image evaluation system in which a test image stored in a memory device and a quantified result are exchanged over an Internet, according to an embodiment.

FIG. 10 is a block diagram of an image evaluation system in which a test image stored in a memory device and a quantified result are exchanged over an Internet, according to an embodiment of the present disclosure.

Referring to FIG. 10, an image evaluation system 200D includes a computing device 300D and a server 500D communicating with each other over the communication network. The server 500D may be a computing device that executes the image evaluation computer program 150 performing an image evaluation operation.

The test image TIM stored in a memory device 305 is sent to the communication device 510 of the server 500D over the communication device 330 and the communication network, under control of the processor 320.

The image evaluation computer program 150 executed by the processor 531 of the server 500D processes the test image TIM and generates the quantified result value IDV and the difference image DIFF corresponding to a quantified result. At least one of the difference image DIFF and the quantified result value IDV is sent to the communication device 330 of the computing device 300D over the communication device 510 and the communication network.

At least one of the difference image DIFF and the quantified result value IDV received through the communication device 330 may be displayed on the display device 350 under control of the processor 320 of the computing device 300D.

As described with reference to FIGS. 1 to 10, the image evaluation computer program 150 may obtain an artifact-free reference image from an aligned image by using the phenomenon that an image becomes a lattice pattern, for example a chessboard pattern image, when the image is compressed, or when the image is highly compressed or extremely compressed, through feature value decomposition, for example truncated singular value decomposition (SVD), may detect artifacts, which may be for example structural artifacts, included in the image by using the artifact-free reference image, and may generate a quantified result by quantifying a detection result. Herein, the structural artifacts may mean artifacts generated by an ISP.

The image evaluation computer program 150 may generate an artifact-free reference image (e.g., a compressed image) from a single image (e.g., a test image) by using SVD image compression.

The image evaluation computer program 150 may create a reference image in which the image sharpness, referring to the degree to which a shape of an outline included in an image appears clearly, is invariant, and may generate a quantified result by quantifying a difference the reference image and an image including artifacts.

The image evaluation computer program 150 may quantify structural distortion included in the image and may generate a quantified result.

The image evaluation computer program 150 may align a test image including a lattice pattern formed by image edges more finely by using the Radon transform and may create an aligned image including the aligned image edges.

The image evaluation computer program 150 may quantify the detail of an image distorted by artifacts to perform quantitative evaluation on the image.

According to an embodiment of the present disclosure, an image evaluation method and a computer program performing the image evaluation method may accurately align a test image (e.g., a chessboard image) including a first lattice pattern formed by image edges by using the image edges.

According to an embodiment of the present disclosure, an image evaluation method and a computer program performing the image evaluation method may quantify, or express the quantity of, distortion appearing in a test image (e.g., chessboard image) and thus may match the degree of distortion, which a human may perceive with respect to the test image, and the degree of quantified distortion.

According to an embodiment of the present disclosure, an image evaluation method and a computer program performing the image evaluation method may generate a test image by using parameters set in an image processing processor before tuning, may accurately align the test image to generate an aligned image, may compress the aligned image to generate a compressed image, may quantify a difference between the compressed image and the aligned image in units of a pixel, may generate new parameters by using a quantified result, and may again tune the image processing processor by using the new parameters.

Accordingly, according to an embodiment of the present disclosure, an image evaluation method and a computer program performing the image evaluation method may optimize parameters of an image processing processor.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image evaluation method comprising:
obtaining a test image including a first lattice pattern formed by image edges;
aligning the test image using the image edges to generate an aligned image including a second lattice pattern formed by aligned image edges;
generating a compressed image by compressing the aligned image; and generating a quantified result by quantifying a per-pixel difference between the compressed image and the aligned image.

2. The image evaluation method of claim 1, wherein the generating of the aligned image comprises:
   aligning each image edge of the image edges in at least one of a horizontal direction and a vertical direction; and
   generating the aligned image including the second lattice pattern formed by the aligned image edges.

3. The image evaluation method of claim 1, wherein the generating of the aligned image comprises aligning the test image using Radon transform to generate the aligned image.

4. The image evaluation method of claim 1, wherein the generating of the aligned image comprises:
   extracting a quadrilateral region of interest from the test image; and
   warping the extracted quadrilateral region of interest to generate the aligned image.

5. The image evaluation method of claim 1, wherein the generating of the compressed image comprises:
   compressing the aligned image using truncated singular value decomposition to generate the compressed image.

6. The image evaluation method of claim 1, further comprising:
   tuning an image signal processor using first parameters;
   converting, by the image signal processor, first raw data output from an image sensor into the test image based on the first parameters;
   generating second parameters using the quantified result;
   tuning the image signal processor using the second parameters; and
   converting, by the image signal processor, second raw data output from the image sensor into a second test image based on the second parameters.

7. The image evaluation method of claim 1, further comprising:
   receiving raw data output from an image sensor included in a computing device over a communication network;
   converting the raw data into the test image using a first image signal processor;
   generating parameters for tuning a second image signal processor included in the computing device using the quantified result; and
   transmitting the parameters to the computing device over the communication network.

8. The image evaluation method of claim 1, further comprising:
   receiving raw data output from an image sensor included in a computing device over a communication network;
   converting the raw data into the test image using an image signal processor; and
   sending the quantified result to the computing device over the communication network.

9. The image evaluation method of claim 1, further comprising:
   receiving the test image from a computing device over a communication network; and
   sending the quantified result to the computing device over the communication network.

10. An image evaluation method comprising:
    obtaining a test image including a first lattice pattern formed by image edges, noise, and artifacts;
    aligning the test image using the image edges to generate an aligned image including a second lattice pattern formed by aligned image edges;
    removing the noise and the artifacts from the aligned image to generate a reference image including the second lattice pattern; and
    generating a quantified result by quantifying a per-pixel difference between the reference image and the aligned image.

11. The image evaluation method of claim 10, wherein the generating of the aligned image comprises aligning each image edge of the image edges in at least one of a horizontal direction and a vertical direction, and generating the aligned image including the second lattice pattern formed by the aligned image edges.

12. The image evaluation method of claim 10, wherein the generating of the reference image comprises compressing the aligned image using truncated singular value decomposition to generate the reference image.

13. The image evaluation method of claim 10, further comprising:
    tuning an image signal processor using first parameters;
    converting, by the image signal processor, first raw data output from an image sensor into the test image based on the first parameters;
    generating second parameters using the quantified result;
    tuning the image signal processor using the second parameters; and
    converting, by the image signal processor, second raw data output from the image sensor into a second test image based on the second parameters.

14. A computing device comprising:
    a memory device configured to store a test image including a first lattice pattern formed by image edges, noise, and artifacts; and
    a processor configured to evaluate the test image output from the memory device,
    wherein the processor is further configured to:
       align the test image using the image edges to generate an aligned image including a second lattice pattern formed by aligned image edges;
       remove the noise and the artifacts from the aligned image to generate a reference image including the second lattice pattern; and
       quantify a per-pixel difference between the reference image and the aligned image to generate a quantified result.

15. The computing device of claim 14, further comprising:
    an image sensor configured to generate first raw data; and
    an image signal processor configured to convert the first raw data into the test image using first parameters,
    wherein the processor is further configured to generate second parameters using the quantified result, and update the first parameters set in the image signal processor to the second parameters.

16. The computing device of claim 14, further comprising:
    an image sensor configured to generate first raw data and second raw data; and
    an image signal processor,
    wherein the processor is further configured to tune the image signal processor using first parameters, generate second parameters using the quantified result, and tune the image signal processor again using the second parameters,
    wherein based on the image signal processor being tuned using the first parameters, the image signal processor is configured to convert the first raw data into the test image, and wherein based on the image signal processor being tuned using the second parameters, the image signal processor is configured to convert the second raw data into a second test image.

17. The computing device of claim 14, wherein the processor is further configured to generate the aligned image by aligning each image edge of the image edges in at least one of a horizontal direction and a vertical direction.

18. The computing device of claim 14, wherein the processor is further configured to generate the reference image by compressing the aligned image using truncated singular value decomposition.

19. A computing device comprising:
   a memory device configured to store a test image including a first lattice pattern formed by image edges, wherein the test image is generated by an image signal processor based on first parameters; and
   at least one processor configured to:
      align the image edges to obtain aligned image edges;
      generate an aligned image including a second lattice pattern formed by the aligned image edges;
      generate a reference image by compressing the aligned image; and
      generate second parameters based on a difference between the reference image and the aligned image.

20. The computing device of claim 19, wherein the image signal processor is included in the computing device, and
   wherein the at least one processor is further configured to tune the image signal processor based on the second parameters.

21. The computing device of claim 19, wherein the at least one processor is further configured to transmit the second parameters to an external computing device in order to tune an external image signal processor included in the external computing device.

* * * * *